Nov. 26, 1968  E. REICHERT ET AL  3,412,947
APPARATUS FOR ATTACHING WINDING FORMERS ONTO
ELECTRICAL MOTOR STATORS
Filed July 6, 1966  6 Sheets-Sheet 1

INVENTORS
ERNST REICHERT
WILLI MUSKULUS

BY *Larson and Taylor*

ATTORNEYS

Nov. 26, 1968   E. REICHERT ET AL   3,412,947
APPARATUS FOR ATTACHING WINDING FORMERS ONTO
ELECTRICAL MOTOR STATORS
Filed July 6, 1966   6 Sheets-Sheet 3

INVENTORS
ERNST REICHERT
WILLI MUSKULUS

BY *Larson and Taylor*

ATTORNEYS

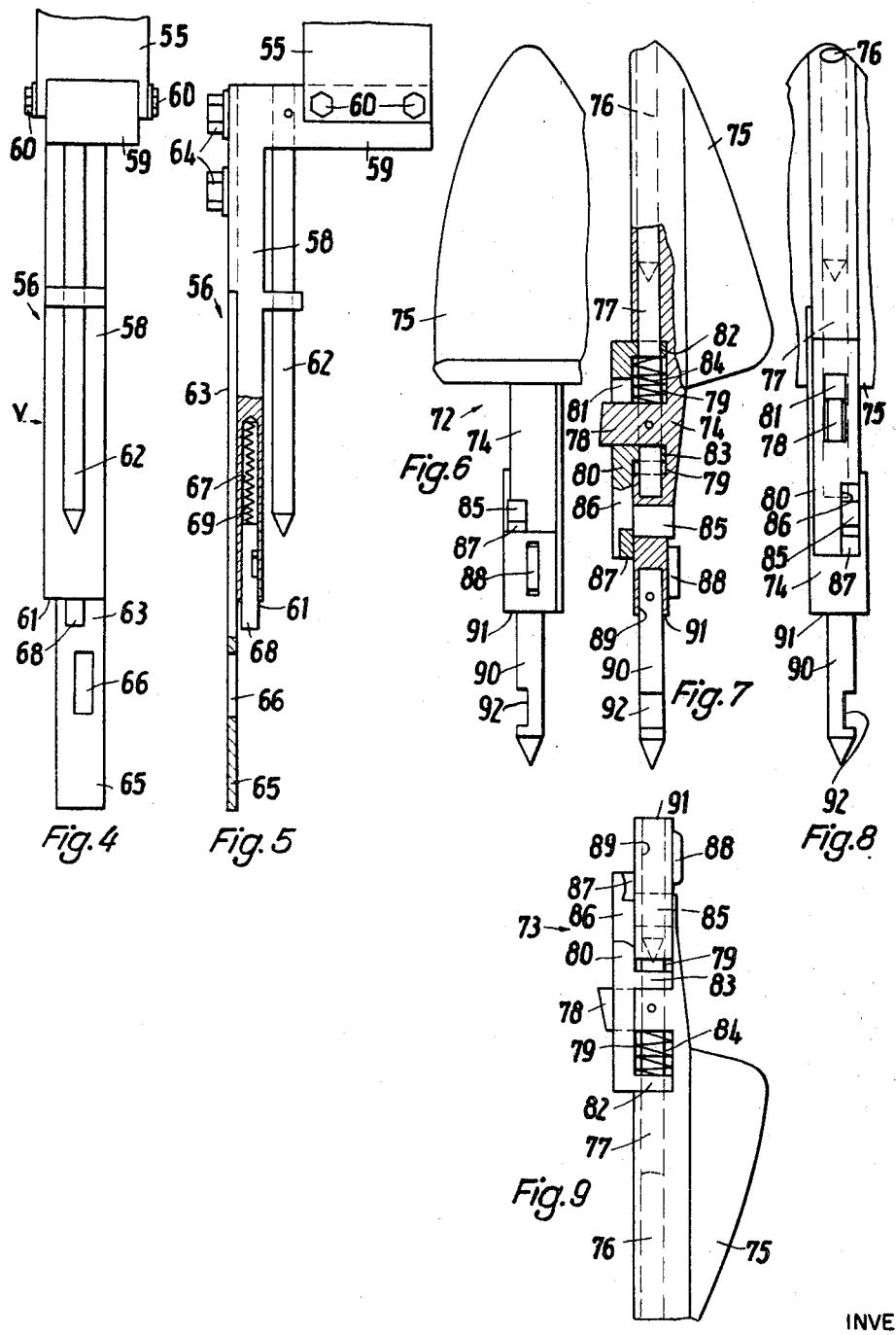

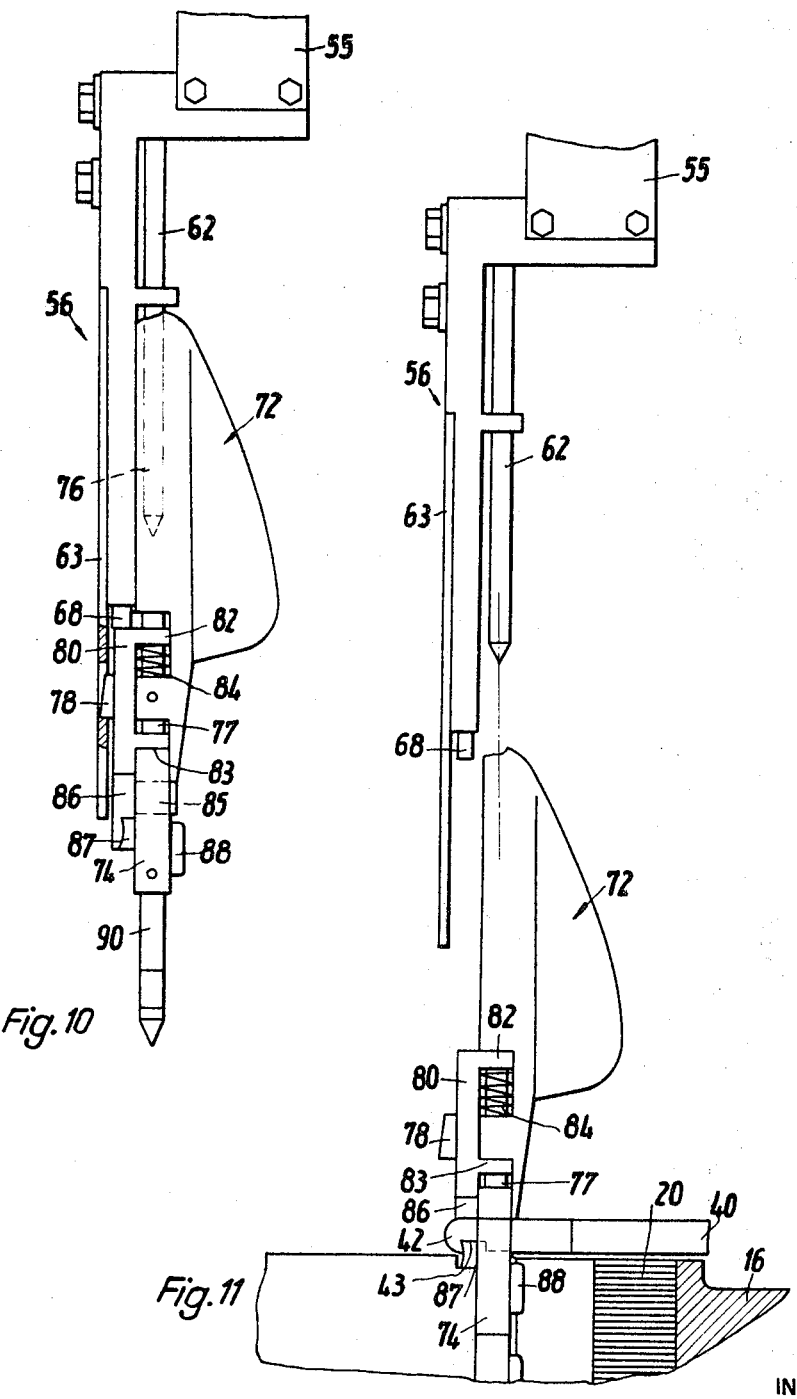

United States Patent Office 3,412,947
Patented Nov. 26, 1968

3,412,947
APPARATUS FOR ATTACHING WINDING FORMERS ONTO ELECTRICAL MOTOR STATORS
Ernst Reichert, Dornigheim (Main), and Willi Muskulus, Bergen-Enkheim, Germany, assignors to Firma Balzer & Droll KG, Bergen-Enkheim, Germany
Filed July 6, 1966, Ser. No. 563,120
Claims priority, application Germany, May 15, 1965, B 81,939
22 Claims. (Cl. 242—1.1)

ABSTRACT OF THE DISCLOSURE

An apparatus for winding a coil onto a stator having a central bore and grooves opening into the central bore, which apparatus includes a needle-carrier movable along a longitudinal axis for moving the coil wire through the grooves, and a mechanism for positioning the stator substantially coaxially about the longitudinal axis. A first winding former is positionable on one side of the stator and a second winding former is positionable on the other side of the stator. The two formers move towards each other through the central bore parallel to the longitudinal axis to engage the formers with each other. The formers are held to each other in a predetermined relationship with respect to the stator by a mechanism movable perpendicular to the longitudinal axis.

This invention relates to a stator winding apparatus. More particularly it relates to an apparatus for positioning and fastening both the main and the auxiliary winding formers onto grooved stator laminate packs which are to be employed in electric motors.

In stator winding machines of the type used for winding wire onto grooved stator laminate packs for electro-motors the stators are first mounted in the apparatus coaxially about the longitudinal axis of the winding machine. The wire is then guided into the stator grooves by means of winding needles. A winding former is placed on the stator body to conduct the wire and ensure that the transfer of the wire from one stator groove into another is effected properly with the formation of the winding head. The winding needles extend in the usual manner radially from a needle-carrier which is mounted on the longitudinal axis of the winding machine and guided to and fro along the said longitudinal axis through the stator bore and pivoted radially of the axis on one direction and then another at its end positioned along the said axis, the angle between the lines of radial movement being dependent upon the individual coil widths. In the pivoted position the needles place the coil into the appropriate groove.

The arrangement of the formers depends upon the size and design of the coils. One winding former is normally sufficient for one coil; or, for the proper formation of the winding heads, so-called auxiliary winding formers are to be positioned and fastened on the stator laminate pack laterally adjacent the so-called main winding former.

In apparatus known heretofore the main and auxiliary winding formers consist of a center shaft-part and respectively one end-part adjoining the shaft-part and lying over a first side of the stator laminate pack. The shape and size of these end-parts is dependent on the width of the coil, the strength of the wire to be used and the working speed of the winding machine. Each of these known winding formers is guided in an axial direction into the stator bore and then placed against the bore-wall radially with its shaft-part. A tongue-like lug for fixing the winding former extends from the shaft-part radially of said axis across the side of the stator. This lug is rigidly connected to the stator laminate pack to hold the winding former firmly against the wall of the stator bore by means of either a screw or a counter-hook which snaps into a tension device placed on the outside of the stator casing.

For positioning the stator laminate pack on the apparatus the one-piece winding former requires a relatively larger stator bore since their tongue-like projections must be guided through the stator bore. Moreover, in mass production, each stator winding machine of the known type requires two complete sets of main and auxiliary winding formers so that during the winding of one stator laminate pack another stator laminate pack can be equipped with the necessary winding formers. Furthermore, if several stator winding machines are in operation at the same time, each machine requires an operator to manually attach and remove the winding formers to and from the stator packs, and remove the wound stator laminate pack from the machine and place a new empty stator laminate pack into the machine to be wound. Thus, owing to the need for extra equipment and labor, the known machines are very expensive to operate.

An object of the present invention is to provide an apparatus in which the positioning and fastening of the winding formers onto a stator laminate pack is effected automatically in a mechanical manner right in the stator winding machine after the stator has been placed therein. In this manner only one set of winding formers is required and a single operator can supervise and operate several stator winding machines simultaneously. Thus a great savings in labor and parts is effected.

The present invention comprises a stator carrier-plate which positions the stator laminate pack on the longitudinal axis of the stator winding machine coaxially to the needle-carrier. Sets of halves of longitudinally divided winding formers are arranged on both sides of the stator carrier-plate and movable towards and away from each other. Locking-slides are displaceably mounted on both sides of the stator carrier-plate to move in a radial direction towards and away from the longitudinal axis of the winding machine and the stator laminate pack to hold the complementary halves of the winding formers to each other and to the stator laminate pack. The stator carrier-plate is mounted in a plane perpendicular to the longitudinal axis of the stator winding machine (that is, the axis along which the needle-carriers move, and the plane which includes the center-stroke of the needle-carrier) on guide-columns extending along the sides of the stator winding machine parallel to the said axis. Each set of the winding former halves is releasably affixed on a pressure-plate, longitudinally displaceable along the guide-columns, one on each side of the stator carrier-plate.

The said halves of the winding formers are designed so as to slide in an axial direction to be locked and unlocked on holders which are fastened on the pressure-plates. For this purpose each holder includes a base-body which is to be fastened on the pressure plate, a guide-rod extending in an axial direction and a leaf-spring extending parallel to the guide rod and having a longitudinal aperture which serves as a snap-catch, the leaf-spring being fastened at one end onto the base-body and with the other end extending beyond the guide-rod and the base-body.

Each winding former which is to be mechanically connected with the stator laminate pack and similarly to be released from the latter includes two symmetrical and complementary halves, each half being provided respectively with one part of a connecting arrangement which aligns the halves centrally with respect to each other.

Each half of the winding formers is, in accordance with the invention, characterised in that from the apex of the winding former conducting-body, that is, the part of the former away from the stator, a guide-bore extends in the longitudinal direction into the former to receive the guide-rod of the holder. On the shaft of each half winding former is arranged a nose member mounted to penetrate into the leaf-spring aperture and a bolt which is displaceable longitudinally into a resting position away from the stator by a compression spring. The bolt is provided on its end facing the stator with a hollow portion corresponding to an aperture in the shaft and has a projection which lies in the plane of the shaft aperture when the bolt is in the rest position. The former aligning arrangement is formed by a guide-bar extending in an axial direction from the free front surface of the shaft of one half winding former and of a guide-bore extending from the free front surface of the shaft of the other half former and receiving the guide-bar. Furthermore, each shaft of the winding former halves has a rib which fits into the slit of the stator grooves open to the stator bore.

The locking-slides hold the winding former halves to each other and to the stator laminate pack. They are arranged in two sets, each set being mounted on an intermediate-plate wherein one intermediate plate lies on one side of the stator carrier-plate and the other intermediate plate lies on the other side thereof. The intermediate plates are longitudinally displaceably mounted on the guide-columns, and the part of each locking-slide pointing towards the stator laminate pack is of a width which corresponds to the distance between two adjacent stator grooves and is provided at its inner end with a recess corresponding to the width of the said projection on the bolt and located on the side of the lock-slide facing the stator laminate pack. The inner end of the locking-slide passes through the aperture in the shaft of the winding former half and the hollow portion of the bolt in its active position when the winding formers have been placed on the stator laminate pack. The lock-slide then comes into contact against the leaf spring of the holder and moves it radially inwardly to free the nose member of the winding former half out of the longitudinal aperture of the half-spring.

In a particularly advantageous manner the stator carrier-plate receiving the stator laminate pack in the machine is sub-divided into two side-plates affixed on the guide-columns and a slide displaceably mounted between these side-plates. The slide has two receiving bores, each for holding one stator laminate pack, the bores lying at a distance from each other such that in each end-position of the slide one of the receiving bores lies on the longitudinal axis of the machine coaxially with the needle-carrier of the stator winding machine, and the other receiving bore is accessible outside the machine.

A further feature of the invention is that the locking-slides which are not in use for fastening the halves of the winding former on the stator laminate pack may be pushed radially inwardly to serve as protective fingers overlying the face of the stator between two stator grooves for preventing deformation of the face during the winding process.

Further details of the invention will become apparent from the detailed description of an exemplary embodiment together with the accompanying drawings wherein:

FIGURE 4 is a front view of the holder for respectively one half of the winding former.

FIGURE 5 is a side view of the holder according to FIGURE 4, seen in the direction of the arrow V.

FIGURE 6 is a front view of half a winding former.

FIGURE 7 is a side view, partly in section, of the half of the winding former according to FIGURE 6.

FIGURE 8 is a rear view of the half of the winding former according to FIGURES 6 and 7.

FIGURE 9 is a partial side view of the other half of the winding former.

FIGURE 10 is a side view of a half of a winding former releaseably connected to a holder.

FIGURE 11 is a side view of a half of a winding former which is locked with the stator laminate pack and released from the holder.

Figure 1:
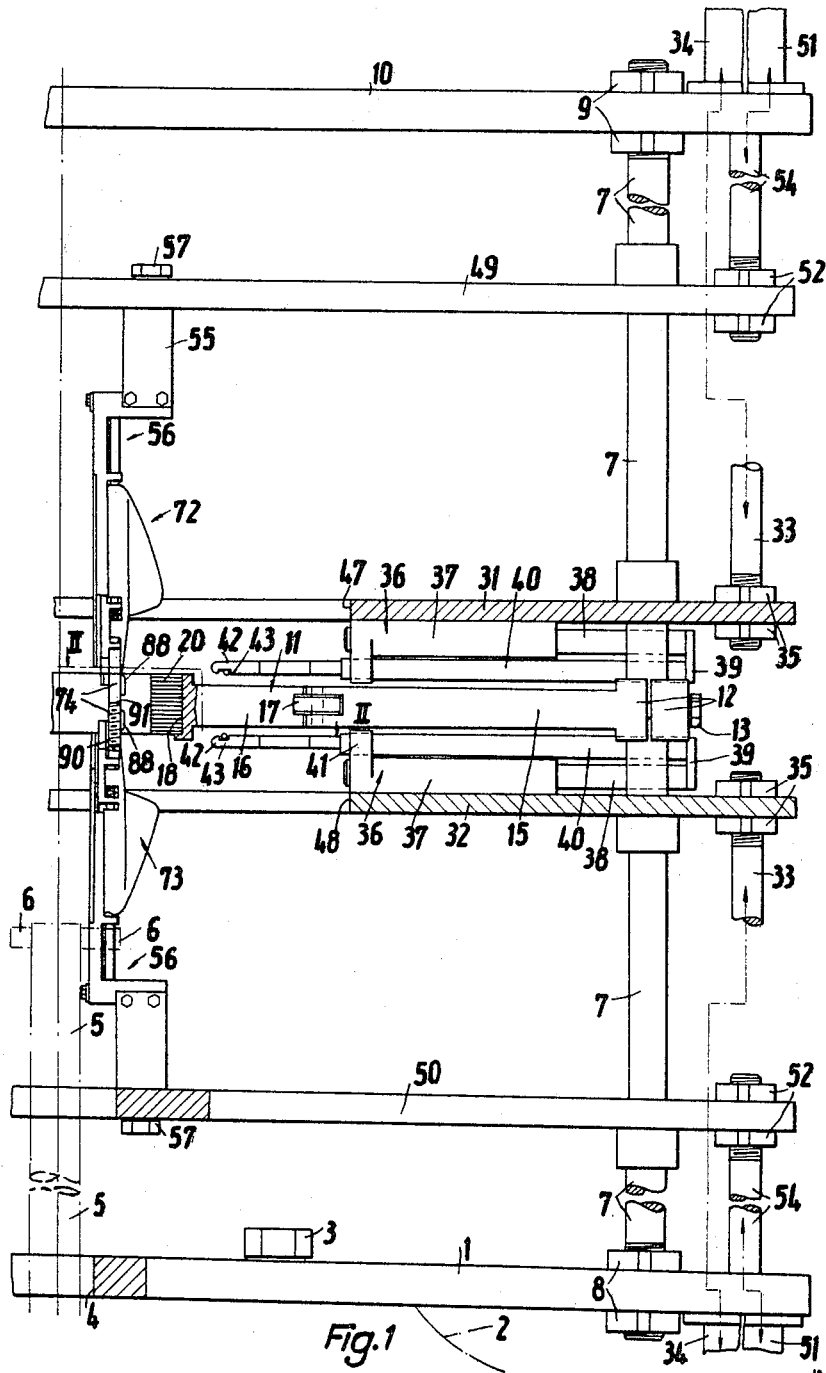
FIGURE 1 shows the former attaching part of a stator winding machine in accordance with the present invention, in which only the part lying on one side of the longitudinal axis is illustrated. The part on the other side is symmetrical in design to the side shown.

The apparatus in accordance with the invention, of which only one side is illustrated in FIGURE 1, contains a base-plate 1 which is fastened, for example by means of screws 3, on the upper part of a stator winding machine at 2. The base-plate is provided with a central aperture 4, through which is guided the needle-carrier 5 of the stator winding machine. On the upper end of this needle-carrier are arranged two winding needles 6 extending radially. As is known, the needle carrier 5 is moved to and fro in a longitudinal direction by the drive of the winding machine (not illustrated) and rotated transversely backwards and forwards in its upper and lower dead-position at a respectively predetermined angle. The axis of the needle-carrier 5 corresponds to the longitudinal axis of the former attaching apparatus of the present invention.

Figure 3:
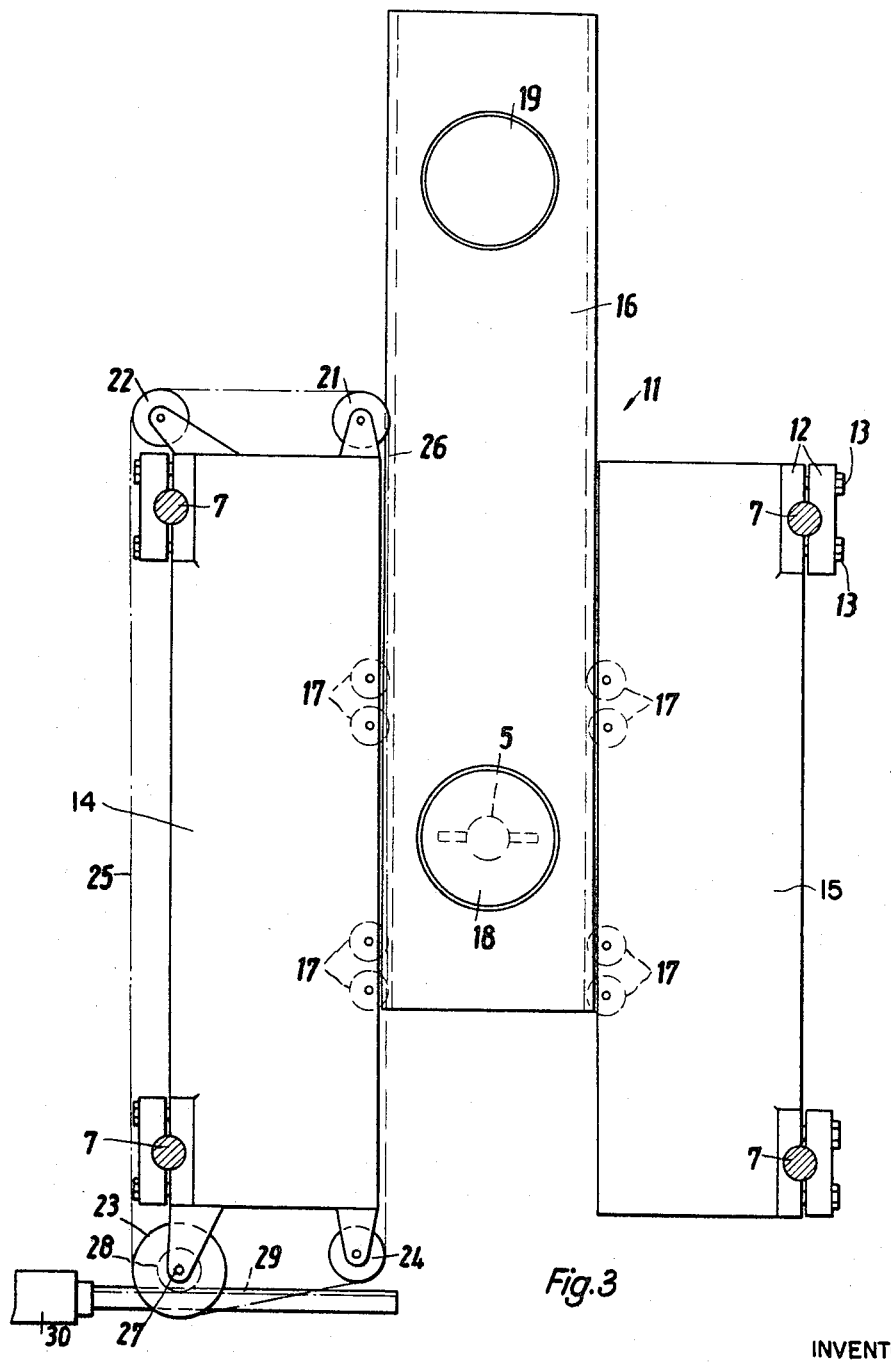
FIGURE 3 illustrates the part of the device which receives the stator laminate pack.

On the base-plate 1 are arranged several longitudinally extending guide-columns 7, fixed for example by means of nuts 8. Only one of these guide-columns can be seen in FIGURE 1. On their upper ends these guide-columns carry a cover-plate 10, fastened by means of nuts 9, which is parallel to the base-plate 1. Approximately in the longitudinal center of the guide-columns 7 is fastened a carrier-plate 11 extending parallel to the base-plate, for example by means of separated locking-bearings 12 which surround the guide-columns and which are locked with the guide-columns by means of torsion-screws 13. The stator carrier-plate 11 is designed such that it permits, in a particularly expedient manner simultaneous introduction of a stator laminate pack to be wound and extraction of a wound stator laminate pack from the apparatus. For this purpose (see FIGURE 3) the carrier plate is sub-divided into two side-plates 14 and 15 fastened, as described above, on the guide-columns, and a slide 16 slidably mounted between the side plates by means of several carrier rollers 17 displaceably arranged between the side-plates. The slide has two receiving bores 18 and 19 for receiving stator laminate packs 20 which are to be wound. The bores lie at such a distance to each other in the displacing direction of the slide that, in the one end-position of the slide receiving bore 18 lies with the inserted stator laminate pack exactly coaxial to the needle carrier 5, while the other receiving bore 19 is easily accessible outside the device. The slide 16 is displaceable so far that, in its other end-position, the receiving bore 19 lies coaxial to the needle-carrier 5 and the receiving bore 18 lies accessible outside the device. For this purpose, as shown in FIGURE 3, rollers 21, 22, 23 and 24 are rotatably mounted on one of the side-plates, e.g. on the side-plate 14. The rollers are guided by an endless rope or chain 25 fastened to the slide 16 at the point 26. The turning-roller 23 is mounted on a shaft 27 which carries a toothed gear wheel 28. This toothed gear wheel engages a toothed pinion rod 29 which is moved by the piston of a double acting hydraulic cylinder 30 The translational and drive ratios are to be chosen such that the slide 16 assumes respectively the required end-positions for the working position of the receiving bores 18 and 19.

Above and below the stator carrier-plate 11 are arranged respectively intermediate-plates 31 and 32, each of which is provided with a central through-opening 47 and 48 respectively. These intermediate plates are movable along the guide-columns 7, the movement being actuated by means of piston-rods 33, fastened to the plates by nuts 35. The rods 33 are moved by double acting hydraulic cylinders 34 on the base-plate 1 and the cover-plate 10. Two of these cylinders are partly indicated in FIGURE 1. These intermediate-plates serve as carriers for several locking units 36, the function of which is described in more detail below.

Figure 2:
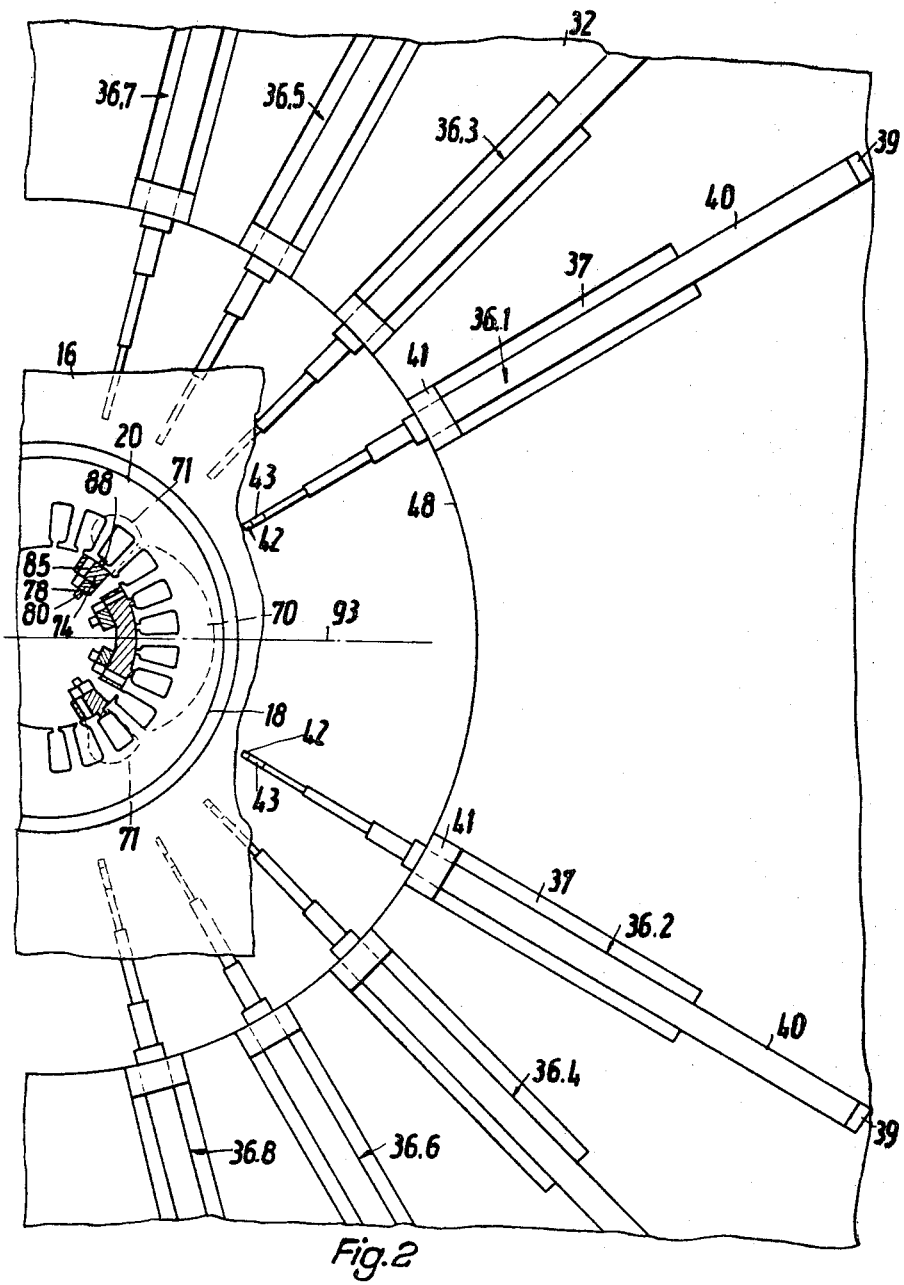
FIGURE 2 is a partial sectional view taken along the line II—II of FIGURE 1.

Each locking unit comprises a double acting hydraulic cylinder 37 fastened to one of the intermediate-plates 31 or 32 and a piston-rod 38 which is rigidly connected at one end through a bridge 39 with the end of a locking-slide 40. This locking slide is guided parallel to the piston-rod 38 in a bearing 41 arranged on the hydraulic cylinder and, as may be seen from FIGURE 2, is directed radially towards the longitudinal axis of the stator laminate pack 20. The leading end of the locking-slide has a rectangular cross-section and is tapered to such an extent that, as described below, this end passes over the flat end of the pack between two adjacent grooves of the stator laminate pack. On the side of the locking-slide 40 turned towards the stator carrier-plate 11, near its inner end 42 is provided a recess 43. The arrangement of the locking units 36 on the displaceably-mounted intermediate-plates 31 and 32 makes it possible to adjust the distance in height of the locking-slide 40 relative to the stator carrier-plate 11 to the width of the respective stator laminate pack which is to be wound.

Between the base-plate 1 and the lower intermediate-plate 32, and between the cover plate 10 and the upper intermediate plate 31, are arranged, respectively, upper and lower pressure-plates 49 and 50. Each pressure-plate is guided on the guide-columns 7 and, by means of several double acting hydraulic cylinders 51 which are similarly arranged on the base-plate 1 and the cover-plate 10, are movable upwards and downwards by piston-rods 54, which are connected to the pressure-plates by nuts 52. On the side of the pressure-plates turned towards the carrier-plate 11 several holders 56 are fastened by means of small pedestals 55, for example, by screws 57, for holding the winding formers.

Since the holders are of identical design, only one of them is described in connection with FIGURES 4 and 5. The holder 56 comprises an oblong base-body 58 of substantially flat, rectangular cross-section. On the upper end of the base-body, with regard to FIGURES 4 and 5, there is a lateral lug 59 which is fitted into a hollow in the small pedestal 55 and connected with the latter by means of screws 60. A guide-rod 62 fastened in the lug 59, is spaced from and extends parallel to the leading side of the base-body 58.

A leaf-spring is arranged on the back of the base-body 58, which leaf-spring in a particularly advantageous and simple manner protrudes downwardly over the base-body and is fastened by means of screws 64. The leaf-spring has a rectangular longitudinal aperture 66 in the vicinity of its lower end 65. A bore 67 extends upwardly from the lower free surface 61 of the base-body 58, in which bore a pressure-bar 68, jutting out of the said bore, is displaceably arranged against the effect of a compression-spring 69 inserted in the bore.

The design of a winding former, which is used in connection with the device in accordance with the invention, is described in FIGURES 6–9. Each winding former consists of an upper half 72 and a lower half 73. Since both halves are symmetrical in design except for one guide-bar and one guide bore, only the upper half 72 is described in detail.

On the end of a shaft 74 of substantially rectangular cross-section is arranged the conducting-body 75, which in a known manner ensures the proper transfer of the winding wire from one stator groove into the other and is formed corresponding to the conditions of winding. From the apex of the conducting-body 75 extends an axially directed guide-bore 76 in which a bar 77 is inserted to such a depth that enough room remains for the guide-rod 62 of the previously described holder 56 to be guided into the guide-bore. A nose member 78, which is designed to penetrate into the aperture 66 in the leaf-spring 63, extends in a transverse direction on the leaf of the shaft 74. The shaft 74 is provided with a hollow 79 enclosing a part of the nose member 78, in which hollow 79 the above-mentioned bar 77 lies free. Against the back of the shaft 74 lies a bolt 80 which has an aperture 81, for the nose member 78, designed in the form of a longitudinal slot and the bolt is provided with lugs 82 and 83 extending into the hollow 79. In this connection the lug 82 lies above, and the lug 83 lies below the nose member 78. Both lugs are pierced by the bar 77 with sliding seat and by a compression-spring 84 wound round the bar 77 between the upper lug 82 and the nose member 78. The resilience of the spring 84 is less than that of the spring 69 in the holder 56, and it urges the bolt 80 constantly into its upper end-position. An aperture 85 directed towards the bolt 80 is provided in the shaft 74 beneath the nose member 78. This aperture 85 substantially corresponds in its size and shape to the cross-section of the inner end 42 of the locking-slide 40 of the locking units 36.

The bolt 80 of the winding former has a lateral hollow 86 which, in the lower end-position of the bolt 80, is aligned with the aperture 85 of the shaft 74, but in the upper end-position of the bolt 80, which can be seen in FIGURES 7 and 8, is offset upwards relative to the aperture 85. The bottom of the hollow 86 is terminated by a projection 87, the breadth of which corresponds to the transverse measurements of the aperture 85 and which, in the upper end-position of the bolt 80, covers the lower part of the aperture 85. As will be described in greater detail below, this projection may enter recess 43 on the inner end 42 of the locking slide 40. On the side of the shaft 74 beneath the aperture 85 is provided a longitudinally-running rib 88 which can enter into the slit of a stator groove lying open to the stator bore. A bore 89 extends inwardly from the free front surface 91 of the shaft 74 in the longitudinal direction, and a guide-bar 90 is rigidly inserted therein. Above the lower end of the guide-bar 91 is provided a hollow recess 92 running parallel to the aperture 85 and lying in the same plane as the latter. This hollow lies, with regard to the free front surface 91 of the shaft 74, symmetrically to the aperture 85 and has the same size and shape as the latter.

The lower half 73 of the winding former illustrated in FIGURE 9 corresponds in its construction to the upper half 72 of the winding former described with regard to FIGURES 6–8, with the single difference that the bore 89 which extends inwardly from the free surface 91 of the shaft 74 is designed in the form of a guide-bore and no guide-bar 90 is inserted therein so that, if both halves 72 and 73 of the winding formers are placed in an axial direction against each other, the guide-bar 90 will be pushed into the guide-bore 89 of the lower half 73 of the winding former and consequently, in the connected position the hollow 92 in the guide-bar 90 is aligned transversely with the aperture 85 in the shaft 74 of the lower half of the winding former.

If the conducting-body 75 of the half of the winding former is relatively narrow, then a shaft designed according to FIGURES 6–9 is sufficient. However if the conducting-body 75 of the half of the winding former is broader, for example like the conducting-body for the main winding former 70 indicated in FIGURE 2, then it may be necessary for the proper securing of the former halves onto the stator laminate pack to design the shaft broader, as may be seen in FIGURE 2, and to provide all bores, apertures, bars, bolts, etc., in duplicate in a symmetrical position on the shaft corresponding to the longitudinal axis of the winding former. For such a broad shaft it is then also necessary to form the base-body 58 of the holder 56 correspondingly broad, and to arrange on it at the required parallel distance to its longitudinal axis two guide-rods 62, two leaf-springs 63 and two pressure-bars 68.

OPERATION OF THE APPARATUS

Before describing the operation of the device it should be pointed out that, for reasons of simplicity and clarity, the conduits for the hydraulic pressure-means leading to and from the individual hydraulic cylinders, and the end-switches which co-operate with individual parts of the device and actuate the control-valves of the hydraulic system, have not been illustrated since their construction does not per se form a part of the present invention and one skilled in the art would be well acquainted with their arrangement and effect. All control-valves and switches of the device and of the stator winding machine are so actuated in a reciprocally dependent manner that from the insertion of a stator pack into the slide 16 of the stator carrier-plate 11 to the extraction from the stator carrier-plate of the wound stator laminate pack, all movements for placing, affixing, releasing and lifting the winding former from the stator laminate pack are effected in a completely automatic manner.

To explain the operation of the apparatus, assume that a grooved stator laminate pack, for example with a two-pole, multi-layer winding having eight grooves, is to be wound. The stator laminate pack 20 has in this case (see FIGURE 2) twenty four grooves when the groove-division is 15°, of which respectively two stator grooves, pertaining to each other with regard to the pole-axis 93, lying together at an angle of 75° and 105° each with a main winding former 70, and the two other stator grooves lying together at an angle of 135° and 165° are wound using two auxiilary winding formers 71 to be placed laterally adjacent the main winding formers 70.

For installing the device for the aforementioned stator laminate pack, one holder 56 is first fastened at the required places on the under-side of the upper pressure-plate 49 and on the upper-side of the lower pressure-plate 50 by means of small pedestals 55 for each pole-coil for the main winding former 70 indicated in FIGURE 2 by dotted lines, and for the two auxiliary winding formers 71, similarly indicated by dotted lines. Each holder 56 is equipped with an upper or lower half of the winding former. For this purpose each half of the winding former, for example the upper half 72 in FIGURE 10, is pushed manually onto the guide-rod 62 of the holder 56 a sufficient distance until the nose member 78 of the half of the winding former clicks into the aperture 66 in the leaf-spring 63 on the holder 56. During this pushing-on the free end of the pressure-bar 68 strikes against the upper surface of the bolt 80 and presses this latter, against the force of the compression spring 84, downwards to such an extent that its hollow 86 is aligned with the aperture 85 in the shaft 74 of the half of the winding former, and the projection 87 comes to lie beneath the aperture 85. The lower halves 73 of the winding formers are similarly releasably connected with the holders 56 on the lower pressure-plate 50. For the coil of the second pole which is not visible in FIGURE 2 and lies opposite the coil of the first pole at an angle of 180°, both pressure-plates 49 and 50 are to be equipped in the same manner.

On the under-side of the upper intermediate-plate 31 and on the upper-side of the lower intermediate-plate 32 are fastened four locking units 36 for each pole-coil on each side of the pole-axis 93. (See FIGURE 2.) The locking-slides 40 extend radially towards the center longitudinal axis of the needle-carrier 5 of the stator winding machine in planes lying between the stator grooves.

Both pressure-plates 49 and 50 and both intermediate-plates 31 and 32 are placed, after being equipped, into the uppermost and lowermost extreme end positions respectively. The slide 16 of the stator carrier-plate 11 is placed in one of its end-positions so that one of the receiving-bores 18, 19 will be freely accessible.

Now, after the stator winding machine itself and the hydraulic system with all the end-switches and switch-valves has been switched and set, to commence operation of the former attaching and winding procedures, the grooved stator laminate pack 20, which is to be wound, is inserted into the freely accessible receiving bore of the slide 16. The stator winding machine and the apparatus for the mechanical positioning and fastening of the winding former co-operating therewith are thus prepared for automatic operation which is initiated by actuation of a push-button switch (not illustrated).

First of all the toothed rod 29 is actuated by the hydraulic cylinder 30 through toothed wheel 28. Rollers 21–24 and the rope 25 then displace the slide 16 to such an extent that the receiving-bore 18 or 19, in which the stator laminate pack 20 is inserted, stands exactly centrally over the needle-carrier 5 (FIGURES 1 and 3).

An end-switch (not illustrated) co-operating with the slide 16 actuates the control-valves of the hydraulic cylinders 34, which displaces the two intermediate-plates 31 and 32 with the locking units 36 towards each other to such an extent that the inner ends 42 of the locking slides 40 lie in the plane of the two side surfaces of the stator laminate pack 20 (see FIGURE 1).

In this end-position of plates 31 and 32 the plates actuate end-switches (not illustrated) which control the valves of hydraulic cylinders 51 causing the two pressure-plates 49 and 50 with the halves 72 and 73 of the main and auxiliary winding formers 70 and 71 to move towards each other until the two free front-surfaces 91 of the shafts 74 of the winding former halves engage each other on the transverse center line of the stator laminate pack 20. In this position the guide-bars 90 of the upper halves 72 of the winding formers are inserted into the guide-bores 89 of the lower halves 73 of the winding formers to align the two halves axially. The ribs 88 are then introduced into the opening slits of the stator grooves lying on the stator bore to align the formers relative to the stator laminate pack 20. FIGURES 1 and 2 show the formers in this condition.

Figure 12:
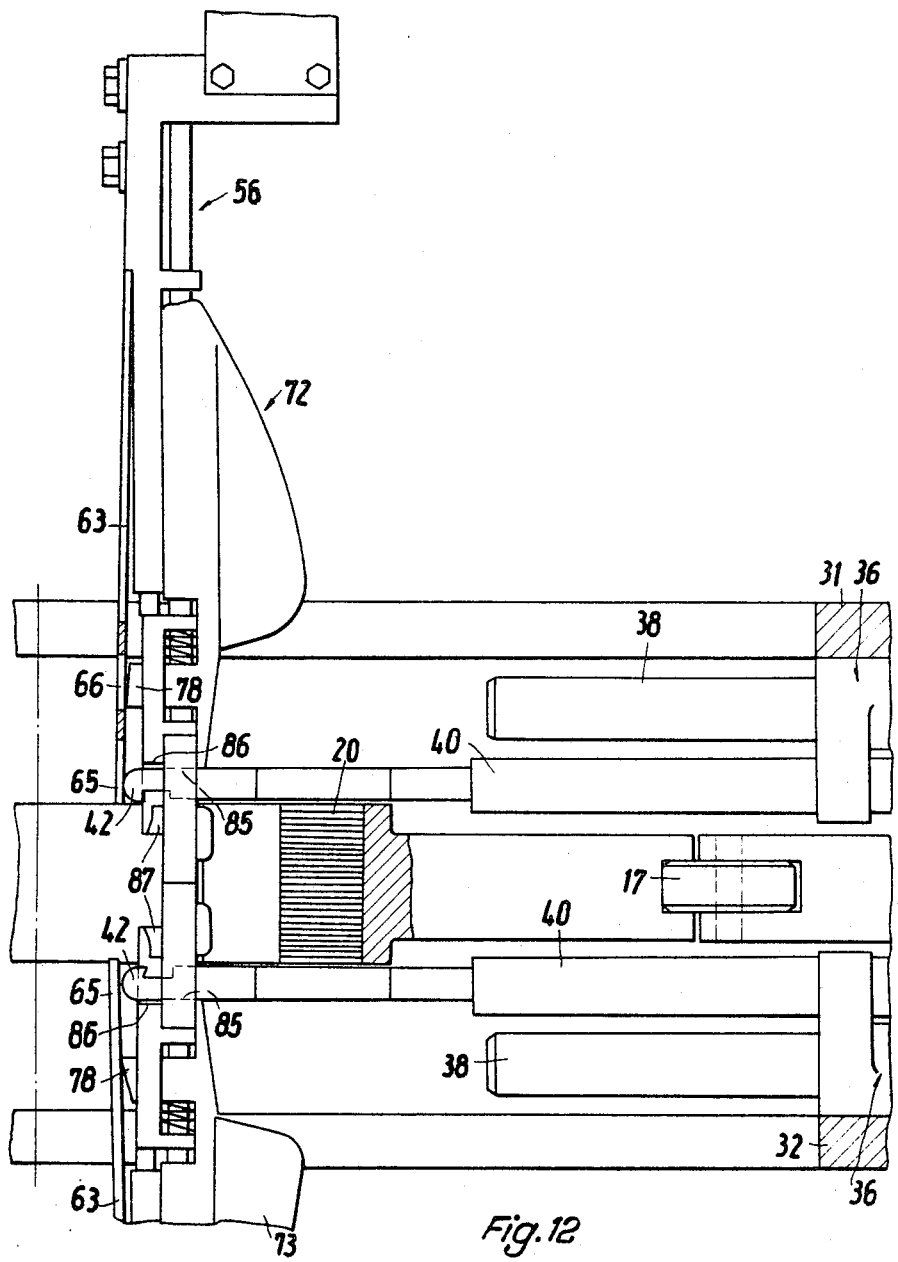
FIGURE 12 is a side view of an intermediate position when positioning and fastening a winding former on the stator laminate pack.

In this position end-switches co-operating with pressure-plates 49 and 50 actuate control-valves for the hydraulic cylinders 37 of the locking units 36 on the intermediate-plates 31 and 32. The locking units are actuated in a certain predetermined sequence. At first only the locking slides 40 of the locking units 36.1 and 36.2, provided for each half of the main winding former, are pushed forward over the front-surfaces of the stator laminate pack 20 (see FIGURE 12). In this position the inner ends 42 of the locking slides 40 pass through the apertures 85 in the shafts 74 of the two halves of the main winding former and through the hollows 86 in the bolts 80 until the ends 42 strike against the lower end 65 of the leaf-springs 63. This moves the leaf-spring far enough from the base-body 58 of the holders 56 for the nose members 78 of the halves of the main winding former to come out of the apertures 66 of the leaf-springs 63. This intermediate position of the parts is shown in FIGURE 12.

End-switches co-operating with the locking-slides 40 then operate the control-valves of the hydraulic cylinder 51 causing the pressure-plates 49 and 50 to come apart. Consequently the holders 56 are released from the upper and lower halves of the main winding former 70 as a result of the liberated nose members 78. The upper and lower halves of the auxiliary winding formers 71 remain releasably connected with their holders 56 because the corresponding locking units 36.5 and 36.6 for these auxiliary winding formers were not actuated. Both halves of the auxiliary winding formers 71 are, therefore, again separated when the two pressure-plates 49 and 50 come apart.

As the holders 56 are released from the upper and lower halves of the main winding formers 70 (see FIGURE 11), the pressure-bar 68 is separated from the bolt 80 of the winding former halves, so that the pressure-spring 84, which was previously compressed, can expand to displace the bolt 80 so that its projection 87 clicks into the recess 43 on the inner end 42 of the locking-slide 40. The hydraulic cylinders 37 of the locking units 36.1 and 36.2 are now automatically reversed to move the locking slides 40 outwardly to draw the halves of the main winding former 70 firmly against the wall of the inner bore of the stator laminate pack 20.

At the same time the locking-slides 40 of the locking units 36.3 and 36.4 are pushed inwardly so that their inner ends 42 are pushed between the 75° and 105° grooves, to prevent the portions of the stack between the grooves from buckling during the winding process. Therefore these locking units 36.3 and 36.4 serve not for locking the halves of winding formers with the stator laminate pack, but for preventing deformation of the pack during winding.

The pressure-plates 49 and 50 must, of course, travel apart far enough so that the winding-needles 6 on the needle-carrier 5 can perform their pivot-movements in the upper or lower end-positions of the said needle-carrier, above or below the ends of the conducting-bodies of the main winding formers.

As soon as the main winding formers are locked onto the stator laminate pack and the pressure-plates have assumed their extreme end-positions, the stator winding machine is automatically switched on by corresponding end-switches, and the winding needles 6 first place the wire in the 75° pairs of grooves and then, after a corresponding abrupt switching of the coil, into the 105° pairs of grooves.

After winding both these coils, the needle-carrier 5 remains stationary in the lower dead-position and switches onto the coil of the 135° grooves, upon which the positioning and fastening of the upper and lower halves of the auxiliary winding formers 71 on the stator laminate pack 20 (FIGURE 2) is effected automatically in the same manner as described with regard to the halves of the main winding formers 70. The locking-slides 40 of the locking units 36.5 and 36.6 move inwardly to lock the auxiliary winding formers 71 onto the stator laminate pack 20, and the locking slides 40 of the locking units 36.7 and 36.8, which have similarly travelled inwardly to support the areas between the 135° and 165° pairs of grooves, prevent deformation during the winding process.

FIGURE 2 shows clearly that for aligning the two halves of the auxiliary winding formers 71 on the stator laminate pack 20, the ribs 88 on the shafts 74 are pushed into the opening-slits lying on the stator-bore of the 105° pairs of grooves which are already filled with the wire filament, so that the shafts 74 can be designed relatively broad and lie on the webs lying adjacent to the 105° groove, and thus assume a secure position.

After the two pressure-plates 49 and 50, which are now empty, are moved into their extreme end-positions the needle-carrier once more automatically begins its upward and downward and pivot movements and, by means of the winding-needles 6, the coils in the 135° and 165° groove-pairs are wound one after the other.

At the end of the winding process the needle-carrier 5 once more assumes its lower dead-position and is once more switched back to the 75° coils. The wire coming from a supply source is then gripped and severed by a clamping and cutting device (not illustrated).

At the same time end-switches (not illustrated) actuate the control-valves of the hydraulic cylinders 51 of the two pressure-plates 49 and 50 so that these pressure-plates once more come together, and consequently the guide-bars 62 of each holder 56 travels into the bore 76 of the halves of the winding formers. During this inward movement the projection 87 of the bolt 80 is still firmly clamped by the locking slide 40 against the half of the winding former. The pressure-bar 68 of the holder 56, on moving inwardly against the bolt 80, compresses the pressure-spring 69. The locking slide 40 is now moved somewhat inwardly automatically by the hydraulic cylinder 37 so that the projection 87 of the bolt 80 is no longer held tightly in the recess 43. The pressure-spring 69 in the holder 56 then urges the pressure-bar 68 towards the stator pack to move the projection 87 out of the recess 43 of the locking-slide 40. The position of the apparatus at this stage of operation is shown in FIGURE 12.

The hydraulic cylinders 37 now act automatically to pull all the locking slides 40 outwardly to their initial position according to FIGURES 1 and 2. At the same time the leaf-spring 63 of each holder 56 returns to its normal position as shown in FIGURE 10, and the nose member 78 of the half of the winding former enters the aperture 66 of this leaf-spring and all the halves of the main and auxiliary winding formers 70 and 71 are thus once more automatically releasably connected to their holders 56.

The pressure-plates 49 and 50 and the intermediate-plates 31 and 32 are then automatically moved away from the stator pack by hydraulic cylinders 34 and 51. The plates thus carry all halves of the winding formers and locking units back to the initial upper and lower positions.

Meanwhile a new stator laminate pack has been inserted for winding into the bore in carrier plate 11 lying outside the device. The slide 16 of the carrier plate 11 is now moved by means of hydraulic cylinder 30 to the other working position so that the new stator laminate pack lies centrally above the needle-carrier 5, and the wound stator laminate pack can be removed from the receiving bore 18 of the slide, which is now freely accessible.

As soon as the slide 16 has assumed its new working position, a new working cycle is automatically initiated and repeated in the previously described manner.

The invention has been described in detail with particular reference to a preferred embodiment thereof. However it should be apparent that variations and modifications can be effected within the spirit and scope of the invention as described hereinabove, limited only by the appended claims.

We claim:

1. In an apparatus for winding a coil onto a stator having a central bore and grooves opening into said central bore, which apparatus includes a needle-carrier means movable along a longitudinal axis for moving the coil wire through the grooves, and a positioning means for positioning the stator substantially coaxially about the longitudinal axis, the improvement comprising:

a first winding former positionable on one side of the stator, a second winding former positionable on the other side of the stator, moving means for moving the said two formers towards each other through the said central bore in a direction substantially parallel to the said longitudinal axis to engage the formers with each other, and a holding means movable in a plane substantially perpendicular to said longitudinal axis for holding the said formers to each other and for holding the said formers in a predetermined relationship with respect to the stator, and said positioning means comprising a carrier-plate, at least one receiving bore in said plate for receiving a stator, said carrier-plate being movable in a plane substantially perpendicular to said longitudinal axis between at least a first position whereat a stator is placed into the receiving bore, and a second position whereat the stator is positioned coaxially about the said longitudinal axis.

2. An apparatus as claimed in claim 1 including a plurality of columns substantially parallel to said axis, and said carrier-plate being slidably mounted between two side plates, each said side plate being connected to at least one of the said columns.

3. An apparatus as claimed in claim 2 wherein the carrier-plate has two receiving bores positioned in the carrier-plate so that as one receiving bore is coaxial with the said axis, the other bore is in a position to receive another stator.

4. In an apparatus for winding a coil onto a stator having a central bore and grooves opening into said central bore, which apparatus includes a needle-carrier means movable along a longitudinal axis for moving the coil wire through the grooves, and a positioning means for positioning the stator substantially coaxially about the longitudinal axis, the improvement comprising:

a first winding former positionable on one side of the stator, a second winding former positionable on the other side of the stator, moving means for moving the said two formers towards each other through the said central bore in a direction substantially parallel to the said longitudinal axis to engage the formers with each other, and a holding means movable in a plane substantially perpendicular to said longitudinal axis for holding the said formers to each other and for holding the said formers in a predetermined relationship with respect to the stator, said holding means comprising at least two locking slides movable in a direction substantially radially of said longitudinal axis, one locking slide being located on each side of the said stator, wherein one locking slide engages one former and the other locking slide engages the other former thereby holding the two formers together and in a predetermined relationship to the said stator, and wherein the apparatus further includes a plurality of columns substantially parallel to said axis, two intermediate-plates mounted on said columns, means for moving the intermediate-plates in a direction substantially parallel to said axis, one plate being mounted on one side of the stator and the other plate being mounted on the other side of the stator, and means for rigidly connecting one of the said lock slides to one of the intermediate-plates and the other lock slide to the other intermediate-plate.

5. An apparatus as claimed in claim 4 wherein the means for moving the intermediate-plates comprises double acting hydraulic cylinders.

6. In an apparatus for winding a coil onto a stator having a central bore and grooves opening into said central bore, which apparatus includes a needle-carrier means movable along a longitudinal axis for moving the coil wire through the grooves, and a positioning means for positioning the stator substantially coaxially about the longitudinal axis, the improvement comprising:

a first winding former positionable on one side of the stator, a second winding former positionable on the other side of the stator, moving means for moving the said two formers towards each other through the said central bore in a direction substantially parallel to the said longitudinal axis to engage the formers with each other, and a holding means movable in a plane substantially perpendicular to said longitudinal axis for holding the said formers to each other and for holding the said formers in a predetermined relationship with respect to the stator, said apparatus further including a plurality of columns parallel to said axis, two pressure-plates mounted on said columns, means for moving the pressure-plates in a direction substantially parallel to the said axis, one plate mounted on one side of the stator and the other plate mounted on the other side of the stator, and a connecting means for releasably connecting each pressure-plate to the corresponding former on the same side of the stator for moving the said former.

7. An apparatus as claimed in claim 6 wherein the connecting means comprises at least one holder rigidly attached to each pressure plate, and slidably, releasably engageable with one of the said formers.

8. An apparatus as claimed in claim 7 wherein each said holder comprises a base body extending from the pressure plate towards the stator in a direction substantially parallel to the said axis and rigidly attached to the pressure-plate, said base body having a free end extending towards the stator, and a guide rod substantially parallel to the said base body and attached to the base body adjacent the pressure-plate and having a free end extending towards the stator.

9. An apparatus as claimed in claim 8 wherein each holder further includes a leaf-spring means attached to the base body and extending from the attachment with the base body towards the stator, and an aperture near the free end of the said leaf-spring.

10. An apparatus as claimed in claim 9 wherein each holder further includes a pressure bar mounted in said base body between and substantially parallel to the guide rod and the leaf-spring, and said pressure bar being mounted to slide towards the stator, and a resilient means for urging the said bar towards the stator.

11. An apparatus as claimed in claim 10 wherein each former includes an outer guide bore for receiving the guide rod on the corresponding holder, and a nose member which is engaged in the said leaf-spring aperture to hold the former to the corresponding holder.

12. An apparatus as claimed in claim 11 wherein each former further includes a lock slide aperture extending through the former substantially parallel to the said axis and located longitudinally along the said former adjacent the corresponding side of the stator when the two formers are engaged with each other, and a bolt member slidable on said former in a direction substantially parallel to said axis and urged by a resilient member to a first position away from the stator and urgeable by the said pressure bar in a second direction closer to the stator when the holder and former are connected, said bolts having a projection which partially closes one side of said lock slide aperture in its first position and leaves the lock slide aperture completely obstructed in its second condition.

13. An apparatus as claimed in claim 12 wherein the said first former has a guide bar extending from the end closest to the stator towards the second former and the second former has a guide bore at its end closest to the first former, said bore being constructed to receive the said guide bar of the first former for connecting the first and second formers together.

14. An apparatus as claimed in claim 13 wherein said guide bar has a groove formed therein, said groove surrounding the lock slide aperature of the second former when the two formers are engaged.

15. An apparatus as claimed in claim 12 wherein each former has at least one rib formed thereon on the side opposite from the said nose member, said rib being adapted to engage a groove in the stator.

16. An apparatus as claimed in claim 12 wherein the said holding means comprises at least two lock sides movable in a direction substantially radially of said longitudinal axis, one lock slide being located on each side of the stator, wherein one lock slide engages one former and the other lock slide engages the other former to hold the two formers together and in a predetermined relationship to the stator.

17. An apparaus as claimed in claim 16 including a means for moving each lock slide member to a position longitudinally of said axis whereat the lock slide members are the same distance from the stator as the lock slide aperture on the corresponding former so that each lock slide aperture is radially aligned with a lock slide, and means for moving the said lock slides radially towards the former and through the said lock slide aperture on the former with which the lock slide is radially and axially aligned.

18. An apparatus as claimed in claim 17 wherein the said leaf-spring on the holder is positioned on the side of the former away from the said lock slide aperture, and the corresponding lock slide is arranged, after passing through the lock slide aperture, to move the leaf-spring thereby releasing the said nose member from the leaf-spring aperture so that upon upward movement of the said holder the said bolt can move from the said second position to the said first position.

19. An apparatus as claimed in claim 18 wherein the lock slide includes a recess near its radially inner end, said recess being engaged by the parts of the bolt which partially close the lock slide aperture when the bolt is in its said first position, said lock slide thereby holding the formers together and in a predetermined relationship with respect to the stator.

20. An apparatus as claimed in claim 17 wherein the said lock slides which are not radially aligned with a lock slide aperture are positioned to be moved radially inwardly between grooves of the stator thereby holding the stator in place during the winding operation.

21. An apparatus as claimed in claim 6 wherein the means for moving each pressure plate includes a double acting hydraulic cylinder.

22. In an apparatus for winding a coil onto a stator having a central bore and grooves opening into the central bore, which apparatus includes a needle-carrier means movable along a longitudinal axis for moving the coil wire through the grooves, and a positioning means for positioning the stator substantially coaxially about the longitudinal axis, the improvement comprising:

a first winding former positionable on one side of the stator, a second winding former positionable on the other side of the stator, moving means for moving the said two formers towards each other through the said central bore in a direction substantially parallel to the said longitudinal axis to engage the formers with each other, and a holding means movable in a plane substantially perdendicular to said longitudinal axis for holding the said formers to each other and for holding the said formers in a predetermined relationship with respect to the stator, and including an intermediate means for moving the said holding means in a direction substantially parallel to said axis.

References Cited

UNITED STATES PATENTS

| Re. 25,281 | 11/1962 | Moore | 242—1.1 |
| 2,847,170 | 8/1958 | Lill et al. | 242—1.1 |
| 2,967,672 | 1/1961 | Zwaver | 242—1.1 |
| 3,129,900 | 4/1964 | Greene. | |
| 3,281,084 | 10/1966 | Lill. | |
| 3,345,001 | 10/1967 | Straub et al. | 242—1.1 |

BILLY S. TAYLOR, *Primary Examiner.*